United States Patent
Nijhawan et al.

(10) Patent No.: US 7,577,813 B2
(45) Date of Patent: Aug. 18, 2009

(54) SYSTEM AND METHOD FOR ENUMERATING MULTI-LEVEL PROCESSOR-MEMORY AFFINITIES FOR NON-UNIFORM MEMORY ACCESS SYSTEMS

(75) Inventors: Vijay B. Nijhawan, Austin, TX (US); Saurabh Gupta, Federal Way, WA (US); Bi-Chong Wang, Austin, TX (US); Wuxian Wu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 11/247,036

(22) Filed: Oct. 11, 2005

(65) Prior Publication Data
US 2007/0083728 A1    Apr. 12, 2007

(51) Int. Cl.
G06F 12/00    (2006.01)
(52) U.S. Cl. .............. 711/170; 711/147; 711/148; 711/171; 711/172; 711/173
(58) Field of Classification Search ............ 711/170
See application file for complete search history.

(56) References Cited

U.S. PATENT DOCUMENTS

| | | | |
|---|---|---|---|
| 6,598,097 B1 * | 7/2003 | Daniels et al. | 710/22 |
| 6,742,086 B1 * | 5/2004 | Cotugno et al. | 711/141 |
| 2002/0087652 A1 * | 7/2002 | Davis et al. | 709/213 |
| 2004/0019891 A1 * | 1/2004 | Koenen | 718/102 |
| 2004/0088498 A1 * | 5/2004 | Accapadi et al. | 711/147 |
| 2007/0073993 A1 * | 3/2007 | Allen et al. | 711/170 |

* cited by examiner

Primary Examiner—Hyung S Sough
Assistant Examiner—Kaushikkumar Patel
(74) Attorney, Agent, or Firm—Baker Botts L.L.P.

(57) ABSTRACT

A system and method is disclosed for enumerating multi-level processor-memory affinities for non-uniform memory access systems. A processor-memory affinity hierarchy for each possible pairing of a microprocessor and a memory unit in an information-handling system is calculated using at least two characteristics relating to memory-access speed that describe how the microprocessors and memory units are arranged in the information-handling system. The information-handling system then performs an algorithm on each processor-memory affinity hierarchy to obtain processor-memory affinity values in the information-handling system, and populates a table using the processor-memory affinity values. An operating system in the information-handling system can use the table to allocate memory units among microprocessors in the information-handling system.

18 Claims, 2 Drawing Sheets

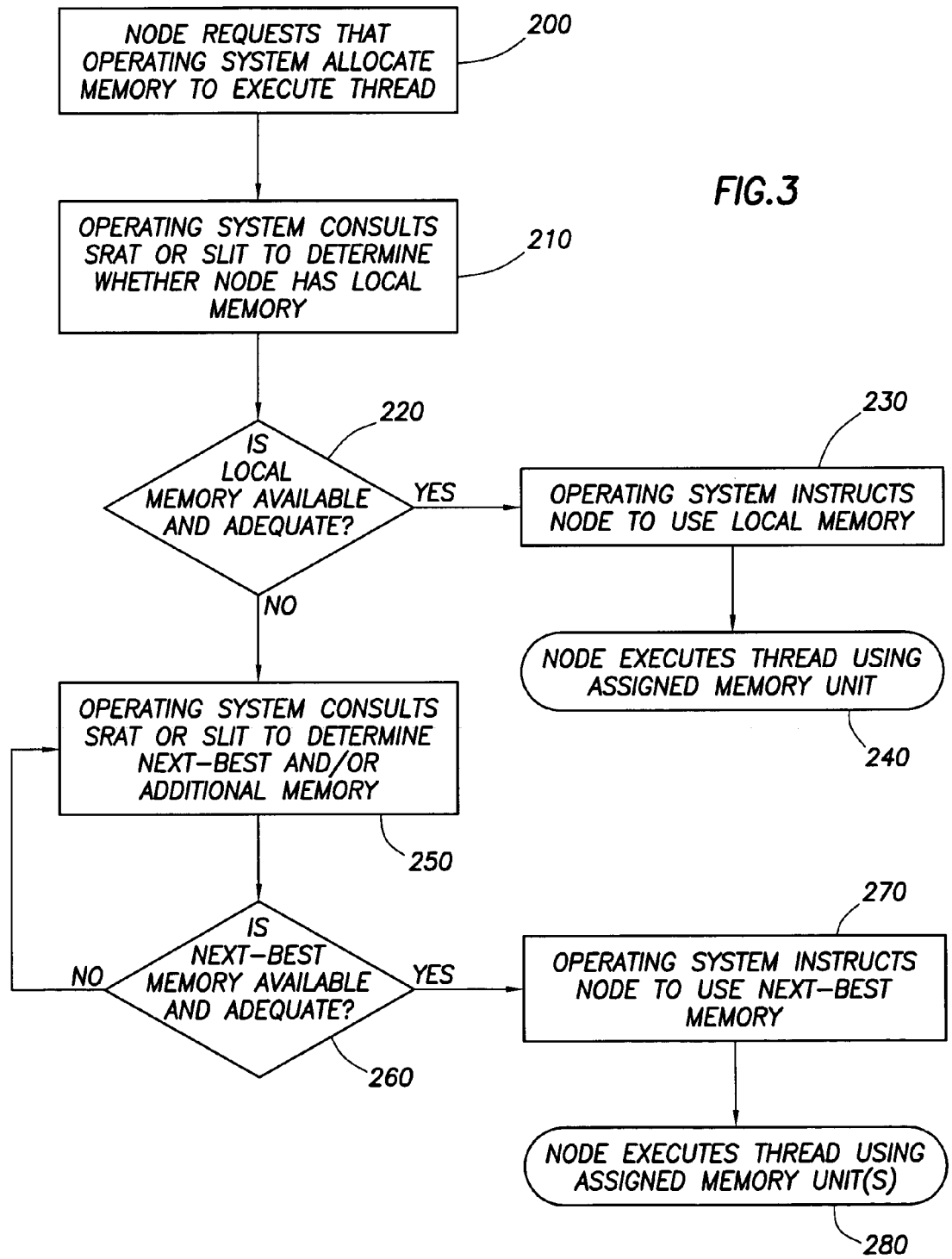

SYSTEM AND METHOD FOR ENUMERATING MULTI-LEVEL PROCESSOR-MEMORY AFFINITIES FOR NON-UNIFORM MEMORY ACCESS SYSTEMS

TECHNICAL FIELD

The present disclosure relates generally to computer systems and information handling systems, and, more specifically, to a system and method for enumerating multi-level processor-memory affinities for non-uniform memory access systems.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Microprocessor speeds have increased dramatically, outstripping memory-access speeds. Although, in the past, microprocessors were slower than their attached storage units, microprocessors must now wait for storage units to complete memory-access requests before completing their tasks. Adding multiple microprocessors to information handling systems, as may be done in servers, only compounds the problem. To reduce delays resulting from memory-access wait times, multi-processor information handling systems may incorporate a Non-Uniform-Memory-Access ("NUMA") architecture in which the memory access time for the different microprocessors depends on the memory location. Each microprocessor is close to some memory locations, such as local memory, and farther from other memory locations, such as memory local to a different microprocessor or shared between microprocessors. Under the NUMA architecture, a microprocessor in the information handling system can access its local memory quicker than it can access non-local memory.

Although using a NUMA architecture can reduce memory-access delays, certain NUMA-based systems still suffer delays because their operating systems inefficiently allocate memory resources among the different microprocessors to complete requested tasks. For example, some microprocessors in the information handling system may not have any local memory, and other microprocessors may have only limited amounts of local memory available. The operating system may not know the distribution of memory units among the microprocessors in the information handling system, and simply allocate memory arbitrarily—even memory that is distant and inconvenient—to a given microprocessor to allow the microprocessor to complete requested tasks. This system of memory allocation is highly inefficient and can increase memory-access times.

The Advanced Configuration and Power Interface ("ACPI") specification allows for tables that describe the architecture of the information handling system so that the operating system may allocate resources more efficiently. These tables include entries that describe the affinity between a microprocessor and the various memory units in the system. An operating-system-friendly interface called the "Static Resource Affinity Table" ("SRAT") can store processor-memory affinities for a particular information handling system. The SRAT, as defined in the ACPI specification, however, does not have the capability to define multi-level memory and multi-processor dependencies for multi-processor systems, such as NUMA-based systems. While this problem can be solved by adding the System Locality Information Table ("SLIT") defined in the ACPI 3.0 specification, current server operating systems, such as Windows 2003 and Windows 2003 R2, often do not support SLITs. Moreover, the population of a SLIT depends only on the distance between the memory unit and the microprocessor. Thus the SLIT values fail to take into account other variables that can affect memory access times, such as link speed, hop count, and the amount of memory associated with a particular link and microprocessor.

SUMMARY

In accordance with the present disclosure, a system and method is disclosed for enumerating multi-level processor-memory affinities for non-uniform memory access systems. A processor-memory affinity hierarchy for each possible pairing of a microprocessor and a memory unit in an information-handling system is calculated using at least two characteristics relating to memory-access speed that describe how the microprocessors and memory units are arranged in the information-handling system. The information-handling system then performs an algorithm on each processor-memory affinity hierarchy to obtain processor-memory affinity values in the information-handling system, and populates a table using the processor-memory affinity values. An operating system in the information-handling system can use the table to allocate memory units among microprocessors in the information-handling system.

The system and method disclosed herein is technically advantageous because they provide an operating system managing an information-handling system with an affinity assessment that takes into account factors that affect memory access speeds and produces affinity values for the components of the system in formats that the operating system can use to allocate tasks among the processing and memory components in the information handling system. This affinity assessment can be used by a variety of operating systems, including those that do not support SLIT. Using the system and method disclosed herein, the operating system can avoid inefficient memory allocation. Because the operating system can use the affinity values to better allocate tasks among resources, the system and method disclosed herein can improve overall system performance, particularly for high-end systems that run memory-intensive applications.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a flowchart illustrating a sample method for efficiently allocating memory units to microprocessors in an information-handling system.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
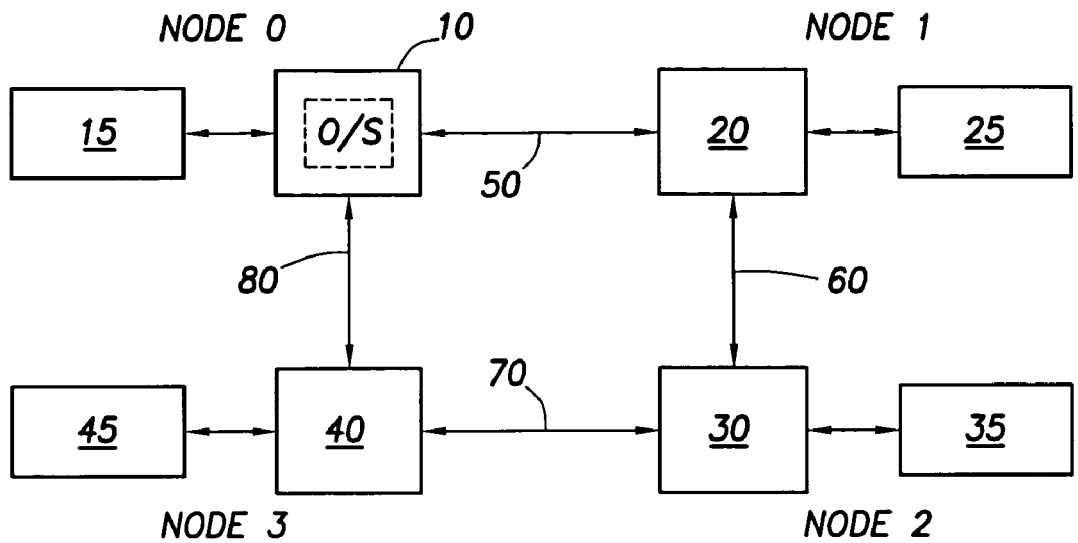
FIG. 1 is a block diagram of example hardware components arranged according to NUMA architecture.

FIG. 1 illustrates certain hardware components of an example NUMA-based information handling system with multiple processors. The information handling system depicted in FIG. 1 includes four microprocessors 10, 20, 30, and 40, respectively. Each microprocessor is associated with a memory unit, 15, 25, 35, and 45, respectively. Memory units 15, 25, 35, and 45 couple to their respective microprocessors via I/O bridges. Each microprocessor forms a "node" with its local memory unit. For example, microprocessor 10 and memory unit 15 together form Node 0, as shown in FIG. 1. FIG. 1 therefore illustrates a system with three other nodes, Node 1, Node 2, and Node 3. One or more of the nodes may run an operating system that can be used to control and manage the hardware and software components of information handling system.

The nodes connect through bidirectional high-bandwidth buses 50, 60, 70 and 80 in sequence, with each node directly connecting to two adjacent nodes. For example, Node 0 connects to Node 1 via bus 50 and to Node 3 via bus 80. Node 0, however, does not directly connect to Node 2; information can travel from Node 0 to Node 2 only by passing through either Node 1 or Node 3 first. As shown in FIG. 1, Node 1 connects directly to Node 2 and Node 0, Node 2 connects directly to Node 1 and Node 3, and Node 3 connects directly to Node 2 and Node 0. The information handling system may include more or fewer hardware components, as necessary. For example, one or more nodes may lack local memory units, or the system may include more or fewer nodes. The information handling system can include a variety of other components not shown in FIG. 1, such as peripherals and file storage units. Moreover, the links between the various nodes may be configured differently, as desired.

A processor-memory affinity algorithm may be used to determine a processor-memory affinity between the microprocessors and memory units in the system depicted in FIG. 1 based on certain factors that affect memory-access speeds. Thus the system can assign numeric processor-memory affinity values to the different nodes in the system that characterize each node's relationship with the other nodes in the system, using numeric evaluations of certain characteristics of the system that affect memory-access speeds. The calculated processor-memory affinity values can then be used to populate an SRAT or SLIT, as appropriate for the operating system in question. The operating system can use the SRAT or SLIT to evaluate how to assign responsibilities for tasks among the nodes in the system.

The characteristics used in the processor-memory affinity algorithm could include the link speed of the buses connecting the nodes, the hop count between the nodes, and the amount of memory associated with the nodes. A processor-memory affinity algorithm, however, may use more or fewer factors, depending on the nature of the system. The system and method disclosed herein may be expanded to include any such factors. The processor-memory affinity algorithm can also assign different weights to the factors depending on how much the different factors affect memory-access speeds. For example, if changes in hop count affect memory access speeds than changes in memory size, the processor-memory affinity algorithm would assign a larger weight to the hop count assessment than to the memory size assessment.

As a simple example, the system depicted in FIG. 1 could calculate a processor-memory affinity hierarchy for Node 1 by evaluating the affinities between Node 1 and each of the other nodes in the system, from the perspective of Node 1. For this first example, assume that the link speeds between the nodes are all equal, so that the processor-memory affinity algorithm need not weigh the link speeds. In this example system, the hop count has more impact on system performance than memory size. The processor-memory affinity algorithm for this system will thus weigh hop-count values more heavily than memory-size values. Assume also that, for the purposes of this first example, Node 1 lacks any local memory (or that memory unit 25 includes 0 MB). Ordinarily, however, each node may have access to some amount of local memory. For the purposes of this example, Node 0 may have 512 MB in memory unit 15, Node 2 may have 1 GB in memory unit 35, and Node 3 may have 2 GB in memory unit 45. As we mentioned previously in this disclosure, however, an information handling system may include more or fewer nodes, as necessary, and the nodes may include more or less memory, as necessary.

As FIG. 1 illustrates, Node 1 is directly linked to Node 0. Information traveling from Node 1 need only make one "hop" to reach Node 0. Thus, from the perspective of Node 1, Node 0 has a hop-count value of 1. Likewise, Node 2 has a hop-count value of 1. Because Node 1 links to Node 3 only through either Node 0 or Node 2, information sent from Node 1 to Node 3 must make two "hops." Thus, from the perspective of Node 1, Node 3 has a hop-count value of 2. Using these hop counts and the assigned memory values, and taking into consideration the greater impact hop count has on memory-access speeds in this system, the processor-memory affinity hierarchy for Node 1 would be:
- Node 2: hop count value=1, memory size=1 GB
- Node 0: hop count value=1, memory size=512 MB
- Node 3: hop count value=2, memory size=2 GB
- Node 1: hop count value=0, memory size=0 MB Depending on the weight assigned to the hop count, and the memory locally available to each node, the processor-memory affinity hierarchy may change. Using a similar evaluation for Node 0 with the same numeric values, the processor-memory affinity hierarchy for Node 0 would be:
- Node 0: hop count value=0, memory size=512 MB
- Node 3: hop count value=1, memory size=2 GB
- Node 2: hop count value=2, memory size=1 GB
- Node 1: hop count value=1, memory size 0 MB Similar affinity hierarchies may be calculated for Nodes 2 and 3.

Again, the SRAT, as defined in the ACPI specification, does not have the capability to define multi-level memory and multi-processor dependencies for multi-processor systems. Thus operating systems relying on SRAT to allocate task responsibilities among the nodes in the system cannot use the processor-memory affinity hierarchy tables as is. In such a case, the processor-memory affinity algorithm for the system can be used to concatenate the factors in the processor-memory affinity hierarchy into one proximity domain. If the operating system supports SLIT, the system may use the processor-memory affinity algorithm to define the proximities between Domain 0 (Node 0), Domain 1 (Node 1), Domain 2 (Node 2), and Domain 3 (Node 3).

In some information handling systems, the link speeds between the various nodes may vary. For example, for the system depicted in FIG. 1, the speed of bus 50, which links Node 0 and Node 1, may be 800 MHz, while the speed of buses 60, 70, and 80 may be 1000 MHz. The processor-memory affinity hierarchy for Node 1 might then change as follows:
- Node 2: link speed=1000 MHz, hop-count value=1, memory size=1 GB
- Node 3: link speed=1000 MHz, hop count value=2, memory size=2 GB
- Node 0: link speed=800 MHz, hop-count value=1, memory size=512 MB
- Node 1: link speed=N/A, hop count value=0, memory size=0 MB Again, the processor-memory affinity algorithm may be used to concatenate the factors in the processor-memory affinity hierarchy into one proximity domain if the operating system can only use SRAT; if the operating system uses SLIT, the processor-memory affinity algorithm may be used to define the proximity between Domain 0 (Node 0), Domain 1 (Node 1), Domain 2 (Node 2), and Domain 3 (Node 3).

One example of a processor-memory affinity algorithm that employs a processor-memory affinity hierarchy to generate the values needed to populate either the SRAT or SLITs may operate as follows. The processor-memory affinity algorithm for the system may give the hop count factor a weighted value of 5. Thus, the higher the hop count between two nodes, the lesser the affinity value for those two nodes. In this example, the processor-memory affinity algorithm for the system will also weight the link speed between the nodes, assigning a weighted value of 3 for each difference in link speed of 200 MHz. Thus, if the link speed between Node 0 and Node 1 differs by 400 MHz from the link speed between Node 1 and Node 2, then the weighted difference of the link speed between the Node 0 and Node 1 pair and the Node 1 and Node 2 pair is 3×2, or 6. Similarly, the processor-memory affinity algorithm for the example system may assign a difference in memory size of 512 MB between two nodes a weighted value of 2. Thus a higher memory capability in one node will create greater affinity towards another node. This processor-memory affinity algorithm is but one example of the many possible algorithms and should not be construed as a limitation on the possible algorithms. For example, a processor-memory affinity algorithm could incorporate other factors beyond link speed, hop count and memory size, if desired.

This example processor-memory affinity algorithm may be applied to the system described in the first example of this disclosure. Again, in that first example, Node 1 lacks any local memory, Node 0 has 512 MB in memory unit 15, Node 2 has 1 GB in memory unit 35, and Node 3 has 2 GB in memory unit 45. The processor-memory affinity hierarchy for Node 1 will look like:
- Node 2: hop count value=1, link speed between Node 1 and Node 2=1 Ghz, memory size=1 GB
- Node 0: hop count value=1, link speed between Node 1 and Node 0=1 Ghz, memory size=512 MB
- Node 3: hop count value=2, link speed between Node 1 and Node 3=1 Ghz, memory size=2 GB
- Node 1: hop count value=0, link speed between Node 1 and Node 1=1 Ghz, memory size=0 MB Using the example processor-memory affinity algorithm, the affinity of Node 1 to other nodes can be calculated:

(i) Affinity between Node 1 and Node 2=(Every 200 MHz difference in link speed between Nodes 1 and 2 as compared to other nodes×3)−(Hop count×5)+(Every 512 MB difference memory×2)=(0×3)−(1×5)+(2×2)=−1

(ii) Affinity between Node 1 and Node 0=(Every 200 MHz difference in link speed between Nodes 1 and 0 as compared to other nodes×3)−(Hop count×5)+(Every 512 MB difference memory×2)=(0×3)−(1×5)+(1×2)=−3

The affinity between Node 1 and Node 3 can be calculated by summing the affinity between Node 1 and Node 2 with the affinity between Node 2 and Node 3. Calculation (i), above, demonstrates that the affinity between Node 1 and Node 2 in this example is equal to −1. The affinity between Node 2 and Node 3 can be calculated as follows:

(iii) Affinity between Node 2 and Node 3=(Every 200 MHz difference in link speed between Nodes 1 and 0 as compared to other nodes×3)−(Hop count×5)+(Every 512 MB difference memory×2)=(0×3)−(1×5)+(2×2)=−1

Thus, the affinity between Node 1 and Node 3 can be calculated by summing (i) and (iii):

(iv) Affinity between Node 1 and Node 3=(Affinity between Node 1 and Node 2)+(Affinity between Node 2 and Node 3)=(i)+(iii)=−1−1=−2.

The affinity between Node 1 and itself may be calculated in this example as follows:

(v) Affinity between Node 1 and Node 1=(Every 200 MHz difference in link speed between Nodes 1 and 0 as compared to other nodes×3)−(Hop count×5)+(Every 512 MB difference memory×2)=(0×3)−(0×5)+(0×2)=0

In this example, Node 1 to Node 1 has the highest affinity because the processor-memory affinity algorithm generated the lowest value when applied to Node 1 as seen from Node 1. Because Node 1 lacks any memory, however, the best solution may be to ignore this value. Thus, the example processor-memory affinity algorithm dictates that Node 1 will have the highest affinity towards Node 2 for this example system. Hence, when developing a SRAT table for the system, Node 1 and Node 2 will be in the same domain. Likewise, when developing a SLIT table for the system, Node 1 will be shown as having the highest affinity towards Node 2.

Figure 2:
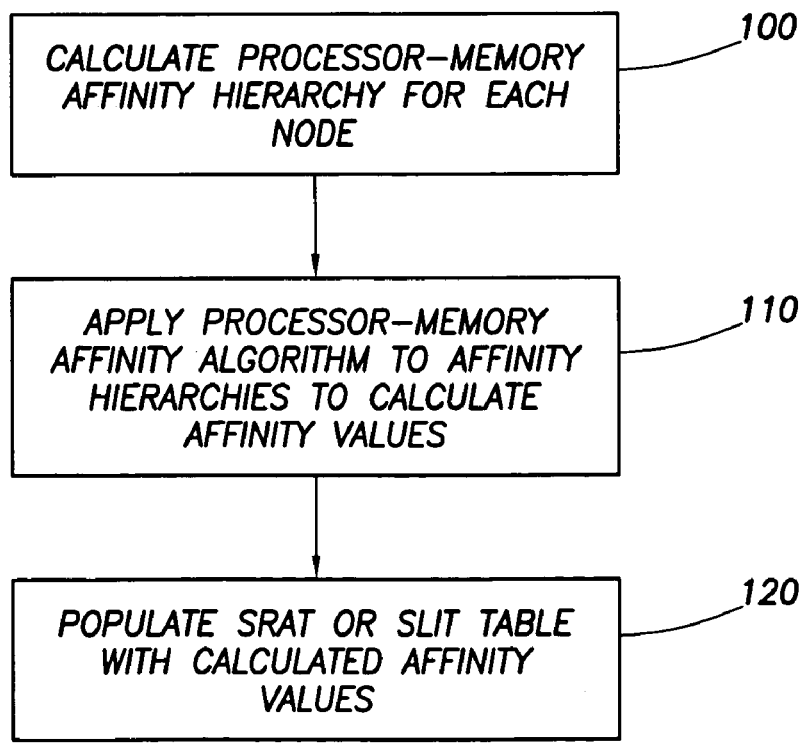
FIG. 2 is a flowchart illustrating a sample method for enumerating multi-level processor-memory affinities for NUMA-based systems.

FIG. 2 illustrates a flow chart of a sample processor-memory affinity enumeration method. In block 100, the information handling system calculates a processor-memory affinity hierarchy for each node in the system. In block 110, the information handling system applies the processor-memory affinity algorithm to the processor-memory affinity hierarchy to obtain the values necessary to populate either the SRAT or SLIT, as necessary. In block 120, the SRAT or SLIT is populated with the calculated affinity values. Later, the operating system in the information handling system may then use the SRAT or SLIT as necessary to allocate resources needed to perform requested tasks.

Once the SRAT or SLIT is populated, the operating system may assign memory to a microprocessor according to the processor-memory affinity values in the SRAT or SLIT. From the operating system's point-of-view, the microprocessors in the nodes will generate multiple threads that will demand that the operating system assign memory to the microprocessors so that they have the resources they needs to execute the threads. FIG. 3 illustrates a flowchart with an example method for allocating memory units to microprocessors. As shown in block 200, a node may notify the operating system that the node has a thread that it needs to execute. The operating system may then consult the SRAT or SLIT to determine how to allocate memory to the node, as shown in block 210. As block 220 indicates, the operating system may then decide whether the memory local to the node is available and sufficiently large to execute the thread. If the local memory is available and adequate, the operating system will instruct the node to use the local memory, as shown in block 230. In almost every case, the local memory will be the most efficient choice. The node can then execute the thread using the assigned local memory unit, as shown in block 240. If the local memory unit is unavailable, the operating system may consult the SRAT or SLIT again to determine which memory unit is the next-best memory unit, as shown in block 250. Similarly, if the local memory is not large enough to manage the task, but is available, the operating system may consult the SRAT or SLIT again to determine which memory unit should be used in addition to the local memory unit, as block 250 also indicates. The operating system then determines whether the next-available memory unit is available and adequate, as shown in block 260. If the next-best memory unit is available and adequate, the operating system will instruct the node to use this next-best memory unit, and the node will execute the thread using the assigned memory unit(s), as shown in blocks 270 and 280. If the next-best memory unit is unavailable or inadequate, the operating system may again consult the SRAT or SLIT to find a new next-best or additional memory unit, as shown in block 250.

Although the present disclosure has described a system and method that assumes the hardware components of the information handling system remain static, the system and method could provide a mechanism to periodically assess whether any hardware components have changed. For example, if a memory unit associated with a node is changed, the system could detect that change, recalculate the processor-memory affinity hierarchy, and repopulate the SRAT or SLIT accordingly. Moreover, each node may have a third link that provides a cross-link to a non-adjacent node. Such a cross-link may complicate the processor-memory affinity hierarchy, but a processor-memory affinity algorithm may be readily extended to cover such a hierarchy. Although the present disclosure has been described in detail, various changes, substitutions, and alterations can be made hereto without departing from the spirit and scope of the invention as defined by the appended claims.

What is claimed is:

1. A method for enumerating processor-memory affinities for an information-handling system comprising at least two microprocessors and at least two memory units, comprising:
   calculating a processor-memory affinity hierarchy for each possible pairing of a microprocessor and a memory unit in the information-handling system using at least two characteristics relating to memory-access speed that describe how the microprocessors and memory units are arranged in the information-handling system,
   performing an algorithm on each processor-memory affinity hierarchy to obtain a processor-memory affinity values for the information-handling system, wherein the processor-memory affinity value is a weighted sum of characteristics in the corresponding processor-memory affinity hierarchy, wherein the algorithm allocates greater weight to characteristics having a greater effect on memory-access speeds than to characteristics having a lesser effect on memory-access speeds, and
   populating a table using the processor-memory affinity values obtained by performing the algorithm, wherein an operating system in the information-handling system can use the table to allocate memory units among microprocessors in the information-handling system.

2. The method for enumerating processor-memory affinities for an information-handling system comprising at least two microprocessors and at least two memory units of claim 1, wherein populating a table using the processor-memory affinity values comprises populating a Static Resource Affinity Table.

3. The method for enumerating processor-memory affinities for an information-handling system comprising at least two microprocessors and at least two memory units of claim 1, wherein populating a table using the processor-memory affinity values comprises populating a System Locality Information Table.

4. The method for enumerating processor-memory affinities for an information-handling system comprising at least two microprocessors and at least two memory units of claim 1, wherein calculating a processor-memory affinity hierarchy for the information-handling system for each possible pairing of a microprocessor and a memory unit in the information-handling system using at least two characteristics relating to memory-access speed comprises calculating a processor-memory affinity hierarchy for each possible pairing of a microprocessor and a memory unit in the information-handling system using link speeds between the microprocessors in the information-handling system.

5. The method for enumerating processor-memory affinities for an information-handling system comprising at least two microprocessors and at least two memory units of claim 1, calculating a processor-memory affinity hierarchy for each possible pairing of a microprocessor and a memory unit in the information-handling system using at least two characteristics relating to memory-access speed comprises calculating an processor-memory affinity hierarchy for each possible pairing of a microprocessor and a memory unit in the information-handling system using a memory size for a memory unit in the information-handling system.

6. The method for enumerating processor-memory affinities for an information-handling system comprising at least two microprocessors and at least two memory units of claim 1, calculating a processor-memory affinity hierarchy for the information-handling system for each possible pairing of a microprocessor and a memory unit in the information-handling system using at least two characteristics relating to memory-access speed comprises calculating a processor-memory affinity hierarchy for each possible pairing of a microprocessor and a memory unit in the information-handling system using a hop count.

7. The method for enumerating processor-memory affinities for an information-handling system comprising at least two microprocessors and at least two memory units of claim 1, further comprising:
   determining that the architecture of the information-handling system has been altered,
   recalculating a processor-memory affinity hierarchy for each possible pairing of a microprocessor and a memory unit in the information-handling system using at least two characteristics relating to memory-access speed that describe how the microprocessors and memory units are arranged in the information-handling system,
   reperforming the algorithm on each processor-memory affinity hierarchy to obtain a new processor-memory affinity values for the information-handling system, wherein the processor-memory affinity value is a weighted sum of characteristics in the corresponding processor-memory affinity hierarchy, wherein the algorithm allocates greater weight to characteristics having a greater effect on memory-access speeds than to characteristics having a lesser effect on memory-access speeds, and
   repopulating the table that the operating system in the information-handling system can use to allocate memory units among microprocessors in the information-handling system.

8. A method for efficiently allocating memory units to microprocessors in an information-handling system, comprising:
   calculating a processor-memory affinity hierarchy for each possible pairing of a microprocessor and a memory unit in the information-handling system using at least two characteristics relating to memory-access speed that describe how the microprocessors and memory units are arranged in the information-handling system,
   performing an algorithm on each processor-memory affinity hierarchy to obtain a processor-memory affinity values for the information-handling system, wherein the processor-memory affinity value is a weighted sum of characteristics in the corresponding processor-memory affinity hierarchy, wherein the algorithm allocates greater weight to characteristics having a greater effect on memory-access speeds than to characteristics having a lesser effect on memory-access speeds,
   populating a table using the processor-memory affinity values obtained by performing the algorithm,
   requesting a memory allocation for a microprocessor in the information-handling system,
   consulting the table to determine an efficient memory unit allocation for the requesting microprocessor, and
   instructing the requesting microprocessor to use a certain memory unit based on the determination of the efficient memory unit allocation.

9. The method for efficiently allocating memory units to microprocessors in an information-handling system of claim 8, further comprising determining whether a certain memory unit identified for allocation in consulting the table to determine an efficient memory unit allocation is available.

10. The method for efficiently allocating memory units to microprocessors in an information-handling system of claim 9, further comprising:
   consulting the table to determine a next-best efficient memory unit allocation for the requesting microprocessor, if local memory is unavailable.

11. The method for efficiently allocating memory units to microprocessors in an information-handling system of claim 8, wherein populating a table using the processor-memory affinity values comprises populating at least one of the following: a Static Resource Affinity Table or a System Locality Information Table.

12. The method for efficiently allocating memory units to microprocessors in an information-handling system of claim 9, wherein calculating a processor-memory affinity hierarchy for each possible pairing of a microprocessor and a memory unit in the information-handling system using at least two factors that affect memory-access speed comprises calculating a processor-memory affinity hierarchy for each possible pairing of a microprocessor and a memory unit in the information-handling system using link speeds between the nodes in the information-handling system.

13. The method for efficiently allocating memory units to microprocessors in an information-handling system of claim 8, wherein calculating a processor-memory affinity hierarchy for each possible pairing of a microprocessor and a memory unit in the information-handling system using at least two factors that affect memory-access speed comprises calculating a processor-memory affinity hierarchy for each possible pairing of a microprocessor and a memory unit in the information-handling system using a memory size for a memory unit in the information-handling system.

14. The method for efficiently allocating memory units to microprocessors in an information-handling system of claim 8, wherein calculating a processor-memory affinity hierarchy for each possible pairing of a microprocessor and a memory unit in the information-handling system using at least two factors that affect memory-access speed comprises calculating a processor-memory affinity hierarchy for each possible pairing of a microprocessor and a memory unit in the information-handling system using a hop count.

15. The method for efficiently allocating memory units to microprocessors in an information-handling system of claim 8, further comprising:
   determining that the architecture of the information-handling system has been altered,
   recalculating a processor-memory affinity hierarchy for each possible pairing of a microprocessor and a memory unit in the information-handling system using at least two characteristics relating to memory-access speed that describe how the microprocessors and memory units are arranged in the information-handling system,
   reperforming the algorithm on the processor-memory affinity hierarchy to obtain a new processor-memory affinity values for the information-handling system, wherein the processor-memory affinity value is a weighted sum of characteristics in the corresponding processor-memory affinity hierarchy, wherein the algorithm allocates greater weight to characteristics having a greater effect on memory-access speeds than to characteristics having a lesser effect on memory-access speeds, and
   repopulating the table using the new processor-memory affinity values.

16. A system for enumerating processor-memory affinities in an information-handling system, comprising:
   at least two microprocessors, wherein the at least two microprocessors are coupled together,
   at least two memory units coupled to the at least two microprocessors, an operating system located on at least one of the at least two microprocessors, and a table of processor-memory affinity values stored in the information-handling system that the operating system can use to allocate one or more of the at least two memory units to the at least two microprocessors, wherein each processor-memory affinity value corresponds to a weighted sum of at least two characteristics relating to memory-access speed that describe how the microprocessors and memory units are arranged in the information-handling system, and wherein the algorithm allocates greater weight to characteristics having a greater effect on memory-access speeds than to characteristics having a lesser effect on memory-access speeds.

17. The system for enumerating processor-memory affinities in an information handling system of claim 16, wherein each of the at least two microprocessors is associated with at least one local memory unit.

18. The system for enumerating processor-memory affinities in an information handling system of claim 16, wherein the system comprises at least three microprocessors coupled together, and wherein at least two non-adjacent microprocessors are coupled together.

\* \* \* \* \*

UNITED STATES PATENT AND TRADEMARK OFFICE
CERTIFICATE OF CORRECTION

PATENT NO. : 7,577,813 B2  Page 1 of 1
APPLICATION NO. : 11/247036
DATED : August 18, 2009
INVENTOR(S) : Nijhawan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

Signed and Sealed this

Seventh Day of September, 2010

David J. Kappos
*Director of the United States Patent and Trademark Office*